United States Patent [19]
Krume

[11] Patent Number: 6,059,013
[45] Date of Patent: May 9, 2000

[54] TURNING PASSAGE FOR THE FEED AND DISCHARGE OF COOLING WATER OF A GUIDE ROLL IN A CONTINUOUS CASTING SYSTEM

[75] Inventor: Walter Krume, Rheinberg, Germany

[73] Assignee: Thyssen Stahl AG, Duisburg, Germany

[21] Appl. No.: 09/068,260

[22] PCT Filed: Nov. 7, 1996

[86] PCT No.: PCT/EP96/04875

§ 371 Date: Jan. 4, 1999

§ 102(e) Date: Jan. 4, 1999

[87] PCT Pub. No.: WO97/17152

PCT Pub. Date: May 15, 1997

[30] Foreign Application Priority Data

Nov. 8, 1995 [JP] Japan .............................. 195 41 615

[51] Int. Cl.[7] .......................... B22D 11/12; B22D 11/124
[52] U.S. Cl. .......................... 164/448; 164/442; 164/443
[58] Field of Search .................................. 164/448, 442, 164/428, 480, 443

[56] References Cited

U.S. PATENT DOCUMENTS 3,807,157  4/1974  Stahlecker .............................. 57/58.89

Primary Examiner—Harold Pyon
Assistant Examiner—I.-H. Lin
Attorney, Agent, or Firm—Proskauer Rose LLP

[57] ABSTRACT

The invention relates to a turning passage for the feed and discharge of cooling water to a disturbing system (2, 3, 4, 5, 6, 7) in a water-cooled guide roller (1) of a continuation casting system. In order to seal the bearing (10) of the guide roller (1) with respect to the fed and discharged cooling water and to protect the rigid coponents of the turning passage which assist in the feed and discharge of cooling water from mechanical loading by the guide roller (1), a seal is mounted in a cover plate (15) supported on the bracket (11) of the bearing (10) so that it is sealed by a bushing (18), can rotate and is axially dispaceable. A flexible, annular, flange-shaped membrane (21) made of plastic or rubber is arranged between this bushing (18) and a flange (20) fastened to the end surface of the bearing journal (9), and its inner and outer edges are vulcanized thereto.

1 Claim, 1 Drawing Sheet

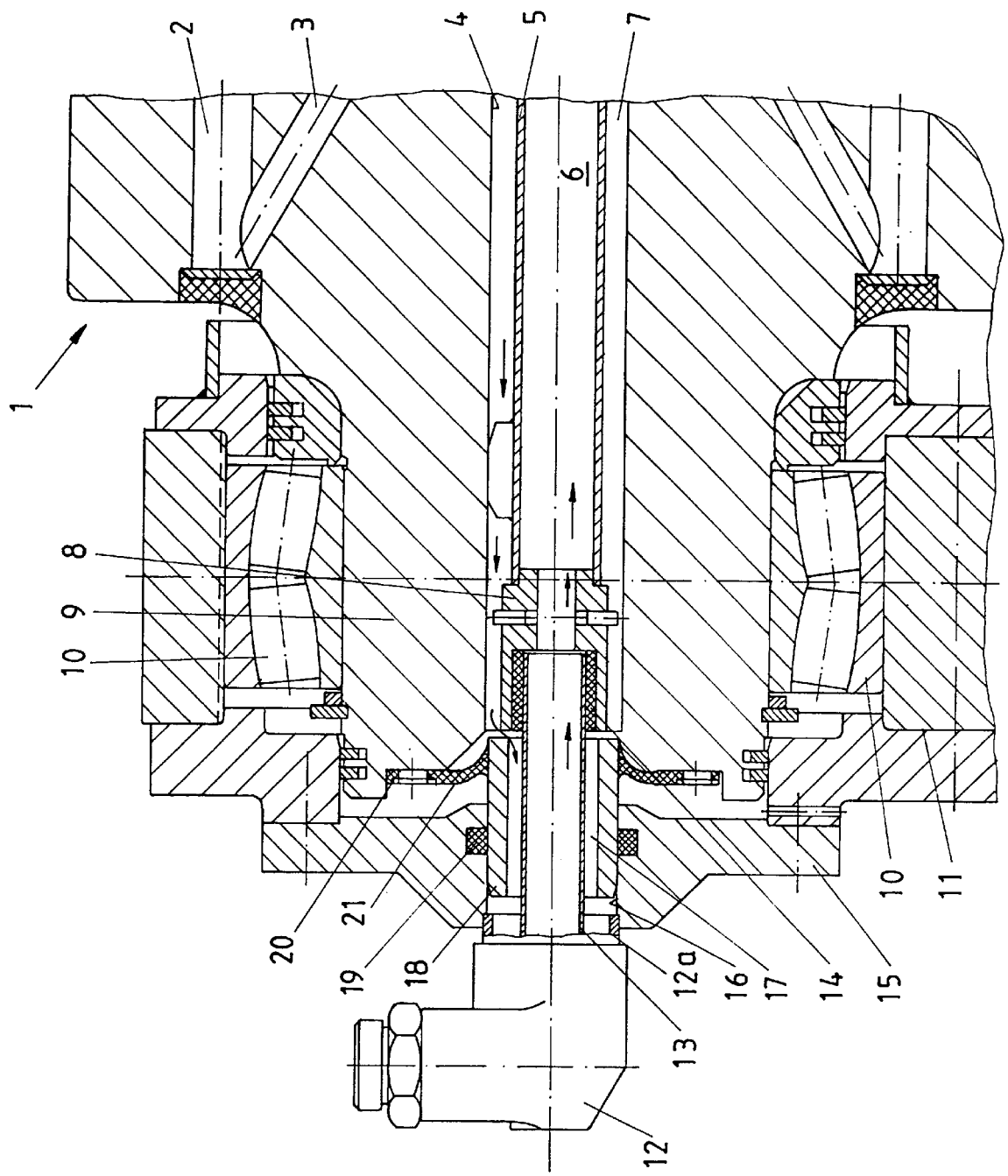

TURNING PASSAGE FOR THE FEED AND DISCHARGE OF COOLING WATER OF A GUIDE ROLL IN A CONTINUOUS CASTING SYSTEM

BACKGROUND OF THE INVENTION

Due to the high temperature of a metal strand emerging from a continuous chill mould, the guide rollers of a continuous casting installation are cooled with cooling water which is centrally supplied to and removed from a distribution system provided in each guide roller via a rotary transmission leadthrough at one or both ends of the guide roller. Since during operation the guide rollers sag and also expand axially, the rotary transmission leadthroughs disposed at the ends of the water-cooled guide rollers are subjected to considerable mechanical loadings which necessitate the stoppage of the continuous casting installation after a relatively short period of service and the replacement of the rotary transmission leadthroughs.

Another disadvantage of the prior art continuous casting installations is that the guide rollers are mounted with their bearing pins in open bearings which must be regularly lubricated. Quite apart from the fact that this causes considerable consumption of lubricant, the bearings are also liable to dirtying and therefore wear, so that they also must be periodically replaced, something which can be done only during a stoppage of the continuous casting installation.

For a long time efforts have been made to eliminate these defects. In a rotary transmission leadthrough which has just become known the bearing pin of the guide roller with its bearing is covered at the end by a cover plate borne by the bearing block of the guide roller. Furthermore, disposed between the cover plate and the bearing pin is a seal which consists of a bush axially moveable and rotatably and covered in a central bore of the cover plate, a flange connected sealing-tight and non-rotatably to the bearing pin, and a flexible sealing connecting member disposed between the bush and the flange, the flexible connecting member taking the form of tubular metal bellows and being disposed in a tubular attachment of the flange. The diameter of the central channel of the distributing system in the bearing pin is increased to accommodate the said attachment with the bellows. Such a rotary transmission leadthrough ensures on the one hand that the bearing is protected against dirtying from outside on one side by the cover plate in conjunction with the special seal and no water can get into the bearing, while on the other hand the rotary transmission leadthrough is not loaded by mechanical forces generated by the sagging of the guide roller and its axial expansion. These advantages result in a prolonged service life of the rotary transmission leadthrough and the bearing. However, it is a disadvantage that the seal operative between the cover plate and the bearing pin is of a very expensive design.

SUMMARY OF THE INVENTION

Starting from said improved prior art, therefore, the invention relates to a rotary transmission leadthrough for the supply and removal of cooling water to and from a guide roller rotatably mounted at its end via bearing pins in bearing blocks in a continuous casting installation, having: a cover plate which covers at least one of the bearing pins with bearing and which is borne by the bearing block and to which the cooling water supply and removal lines are connected; a seal which is operative between the cover plate and the bearing pin and which consists of a bush disposed sealed axially and rotatably in a central bore of the cover plate; a flange connected sealing-tight and non-rotatably to the bearing pin; a flexible, sealing connecting member disposed between the bush and the flange; and a central pipe, borne by the cover plate, for the cooling water supply which forms an annular channel with the bush and leads to a distributing system in the guide roller which is connected to the annular channel for cooling water removal.

It is an object of the invention to provide a rotary transmission leadthrough of the kind specified whose seal, operative between the cover plate and the bearing pin, is of a less expensive construction than the seal of the known rotary transmission leadthrough.

This problem is solved according to the invention by the feature that the sealing central member of the seal takes the form of an annular, flange like membrane of plastics or rubber and is vulcanised by its inner edge to the outside of the bush and by its outer edge to the flange.

The rotary transmission leadthrough according to the invention is of a simple and compact design. It can be completely mounted at the end of the bearing pin. There is therefore no longer any need to increase the diameter of the axial channel of the distributing system in the cooling roller in the front end zone to accommodate parts of the seal therein. The central channel can therefore continuously have the same cross section.

BRIEF DESCRIPTION OF THE DRAWING

The invention will now be explained in greater detail with reference to an embodiment thereof illustrated in the drawing which shows in axial section a water-cooled guide roller of a continuous casting installation with its bearing and its rotary transmission leadthrough for the cooling water.

DETAILED DESCRIPTION OF THE INVENTION

A water-cooled guide roller 1 has in its outer zone axially extending channels 2 and channels 3 discharging thereinto and emerging therefrom and leading to a central distributing system. The central distributing system consists of an axial central bore 4 in the guide roller 1 and a pipe 5 disposed therein which forms a central supply channel 6 for the cooling water and an annular channel 7 for the removal of the cooling water. The pipe 5 is provided with a coupling member 8 at its end face.

At its end face the guide roller 11 bears a bearing pin 9 mounted via a roller bearing 10 in a bearing block 11. To supply the cooling water to the guide roller 11 and remove the water therefrom, disposed laterally alongside the bearing pin 9 is a fix distributing head 12 which is connected via a non-rotatably retained central pipe 13 to the coupling member 8 rotating with the guide roller 1 and is sealed in the coupling member 8 by means of a seal 14.

A cover plate 15 disposed at the end of the bearing pin 9 is attached to the bearing block 11. The cover plate 18 has a central bore 16 in which the distributing head 12 is inserted by an attachment 12a. Pipe 13 also extends through said central bore 16 with radial clearance to form an annular channel 17.

A seal is operative between the cover plate 15 and the bearing pin 9. The seal consists of a bush 18 disposed rotatably and sealed by means of a rotomatic seal 19 in the bore 16. It also consists of a flange 20 which is screwed tightly to the end face of the bearing pin 9, and a central member 21 which takes the form of an annular, flange-like membrane of plastics or rubber and is vulcanised by its inner edge to the outside of the bush 18 and by its outer edge to the flange 20. The flexible central member 21 allows the guide roller 1 to sag and expand axially without the members of the rotary transmission leadthrough connected to the bearing block being subjected to mechanical loading.

In the drawing, arrows in the distributing system indicate the direction of flow of the cooling water supplied and removed. Due to the flexible sealing central member 21 and the rotomatic seal 19 no cooling water can pass into the space between the seal 18, 20, 21 and the cover plate 15 and thence to the bearing 10.

What is claimed is:

1. A rotary transmission leadthrough for supplying and removing cooling water to and from a guide roller rotatably mounted at its end via bearing pins in bearing blocks of a continuous casting installation, comprising:

a cover plate which covers at least one of the bearing pins and a bearing which is borne by one of the bearing blocks and to which cooling water supply and removal lines are connected;

a seal which is operative between the cover plate and the bear pin and which comprises a bush disposed sealed axially and rotatably in a central bore of the cover plate, a flange connected sealing-tight and non-rotatably to the bearing pin, and a flexible, sealing connecting member disposed between the bush and the flange; and a central pipe for the cooling water supply which forms an annular channel with the bush and leads to a distributing system in the guide roller which is connected to the annular channel for cooling water removal;

wherein the sealing connecting member is in the form of an annular flange membrane made of a plastic or rubber material, said sealing connecting member being vulcanized along an inner edge to the outside of the bush and along an outer edge to the flange.

* * * * *